United States Patent Office 3,027,371
Patented Mar. 27, 1962

3,027,371
MOLYBDENUM-CONTAINING DERIVATIVES OF 1-HYDROXY-2-PYRIDINETHIONES AND METHOD OF PREPARING SAME
Bernard A. Starrs, New Haven, Conn., assignor to Olin Mathieson Chemical Corporation, a corporation of Virginia
No Drawing. Filed May 4, 1959, Ser. No. 810,527
6 Claims. (Cl. 260—270)

This invention relates to novel complex compounds useful as fungicides. They are prepared by reacting an alkali-metal or an ammonium molybdate with 1-hydroxy-2-pyridinethione and certain S-substituted derivatives thereof, for example

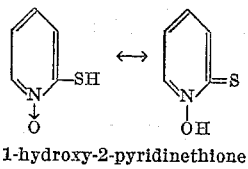

1-hydroxy-2-pyridinethione

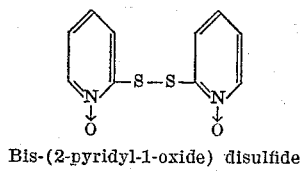

Bis-(2-pyridyl-1-oxide) disulfide

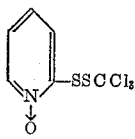

S-(2-pyridyl-1-oxide-S-trichloromethane) disulfide

Suitable reactants also include those which have innocuous substituents on the 3, 4, 5, 6 positions of pyridine-N-oxide ring in addition to the sulfur atom in the 2-position. Examples of some suitable substituents are lower alkyl and halo groups. These compounds can be used as such or they can be used in the form of their alkali metal salts which may be more advantageous and convenient.

The new compounds of this invention are readily prepared by mixing acidified aqueous or alcoholic solutions of the pyridinethione derivative and the molybdate. Suitable molybdates include sodium molybdate ($Na_2MoO_4$) and its dihydrate, potassium molybdate and ammonium molybdate. The order of addition in many cases is not critical. The 2-thiopyridine-N-oxide derivative can be dissolved in water along with the molybdate in many cases and the mixture acidified or an acidified solution of the molybdate can be mixed with the 2-thiopyridine-N-oxide derivative in a suitable carrier.

Complexes having different ratios of molybdenum, oxygen and pyridine rings can be prepared by varying the ratio of the reactants. Examples of some acids which are suitable in acidifying the reaction mixture are acetic, hydrochloric, nitric, sulfuric, or mixtures of these. Although it is advantageous to use the sodium salt, other suitably soluble salts of 1-hydroxy-2-pyridinethione and also the free acid would serve for the preparations.

These compounds are yellowish, brownish-red, and white solids which melt with decomposition between 150° and 210° C. They are insoluble in water, acetone and benzene; but are slightly dissolved by concentrated sulfuric acid. In alkaline solution they revert to the soluble starting materials.

The compounds of this invention can control various fungi when applied to the substrate. They may be used on leather, paper, skin, varnish, rope, textiles and other substrates on which fungi can thrive. When applied to an uninfected substrate they prevent infection thereof by many types of fungi. The compounds can be applied dispersed on an inert finely divided solid and employed as a dust. Suitable solid carriers are clay, talc, bentonite, as well as other carriers known in the art (see Frear, "Chemistry of Insecticides, Fungicides and Herbicides"). Alternately, the compounds may be applied as a spray in a liquid carrier or as a suspension it may be desirable to incorporate wetting agents. The compounds of this invention may also be admixed with carriers that are themselves active, such as other parasiticides, herbicides and fertilizers. These new complexes offer certain advantages over many other 1-hydroxy-2-pyridine thiones and the bis-(2-pyridyl-1-oxide) disulfide which are also biologically active. Specifically, they are less water soluble and thus are not quickly removed by leaching, and they contain molybdenum which is essential to plants.

The following examples further illustrate this invention:

*Example I*

A solution comprising 0.034 mole of sodium molybdate dihydrate in 500 milliliters of water was acidified with glacial acetic acid to a pH of about 4. A second solution comprising 0.067 mole of the sodium salt of 1-hydroxy-2-pyridine-thione in 500 milliliters of water was treated with glacial acetic acid to bring its pH to about 4. The molybdate solution was added to the pyridinethione solution with continuous agitation of the mixture. A yellowish product having the composition $2C_5H_4NOS \cdot MoO_2$ was filtered off, washed with water and dried in a vacuum at 55° C. The yield of this product was 95% and the analysis for the anion of 1-hydroxy-2-pyridinethione $(C_5H_4NOS)^-$ was

| | Percent by weight |
|---|---|
| Theoretical | 66.35 |
| Found | 66.27 |

The product prepared as described above was pulverized and suspended in water. This mixture was divided into several portions which were diluted with water to various concentrations ranging from 10 to 500 parts per million of the molybdenum compound. A group of cucumber plants were sprayed with each suspension. After the residue had dried all of the plants were sprayed uniformly with a suspension of spores of the anthracnose disease fungus, *Colletotrichum lagenarium*, obtained from cultures grown on potato-dextrose agar. These plants were maintained at 100 percent relative humidity and 75° F. for 24 hours and then transferred to a greenhouse and left until the disease developed (3–4 days). The number of lesions per plant was counted. An untreated plant was used as a blank and was taken to be 100% infected and the concentration of active ingredient necessary to give 95 percent control of this disease was calculated. It was found to be 200 parts per million. No phytotoxicity was observed at spray concentrations as high as 500 parts per million.

*Example II*

A mixture was made up containing 0.059 mole of the sodium salt of 1-hydroxy-2-pyridinethione, 880 milliliters of water, 0.06 mole of sodium molybdate dihydrate and 32.6 milliliters of concentrated hydrochloric acid. The pH of this mixture was 0.71. It was stirred for one hour, and the brownish-red product was filtered off, washed with water, and finally vacuum dried at 55° C.

The yield of $2C_5H_4NOS \cdot Mo_2O_5$ was 97%. The analysis for percent $(C_5H_4NOS)^-$ was:

| | |
|---|---|
| Calculated | 48.13 |
| Found | 48.55 |

Tomato plants were tested using suspensions of this compound prepared as described above. Several tomato plants were sprayed with each suspension. The plants were then sprayed uniformly with a suspension of spores of *Alternaria solani*, the organism causing the early blight disease of tomatoes. The plants were held at 100 percent relative humidity and 75° F. for 40 hours and then transferred to the greenhouse where disease lesions developed in 1 to 2 days. The number of lesions on each plant was counted and compared with the untreated checks which were taken to be 100 percent infected. The 500 parts per million suspension of the fungicide produced 82% control of the blight.

*Example III*

A solution was made up containing 0.06 mole of bis-(2-pyridyl-1-oxide) disulfide, 1.5 liters of water and 0.15 mole of sodium molybdate dihydrate. About 45 milliliters of concentrated hydrochloric acid was added, with stirring, to ajust the pH to 0.8 and to precipitate the product. The white product was filtered, washed with water and isopropanol and finally vacuum dried at 55° C. The yield of reaction product, $$3[(C_5H_4NOS)_2] \cdot 2H_2Mo_4O_{13}$$

was 85% based on the disulfide reactant.

| | Percent |
|---|---|
| Calculated for $(C_5H_4NOS)^-$ | 38.93 |
| Found | 39.53 |

This compound was tested as a foliage fungicide by the method described in Phytopathology, 37, 354–356 (1947) and known as the "Test Tube Dilution Technique for Use With the Slide Germination Method of Evaluating Protectant Fungicides." In this test using *Monilinia fructicola* it was found that 25 parts per million was sufficient to completely inhibit the fungus.

*Example IV*

A solution comprising .005 mole of S-(2-pyridyl-1-oxide-S-trichloromethane) disulfide hydrochloride having the formula:

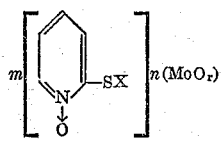

dissolved in 50 milliliters of methanol was mixed with .01 mole of sodium molybdate dihydrate dissolved in 40 milliliters of water. After mixing the solution had a pH of 1.15 and the white product precipitated. This was separated by filtration, washed and dried in a vacuum at 55° C. The yield was 69.9% of $$2(C_5H_4NOSSCCl_3) \cdot H_2Mo_5O_{16}$$

| | Percent |
|---|---|
| Calculated for $MoO_3$ | 55.76 |
| Found | 55.24 |

I claim:

1. A composition of matter having the structural formula selected from the group consisting of:

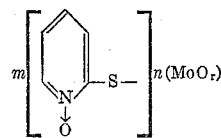

and hydrates thereof, wherein m is an integer from 2 to 3, inclusive, wherein X is selected from the group consisting of 2-thio-(pyridyl-N-oxide) and —SR wherein R is selected from the group consisting of lower alkyl and halo lower alkyl radicals, wherein n is an integer from 1–2, inclusive and wherein r is from 2–3.

2. A composition of matter according to claim 1 having the following structural formula:

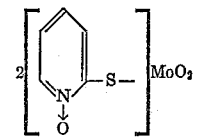

3. A composition of matter according to claim 1 having the following structural formula:

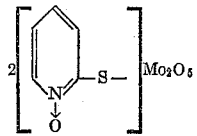

4. A composition of matter according to claim 1 having the following structural formula:

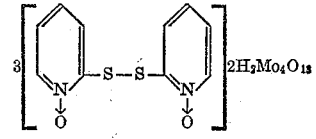

5. A composition of matter according to claim 1 having the following structural formula:

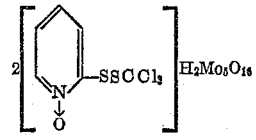

6. The process which comprises reacting a compound having the formula

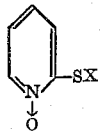

wherein X is selected from the group consisting of hydrogen, alkali metal, 2-thio-(pyridyl-N-oxide) and —SR wherein R is selected from the group consisting of lower alkyl and halo lower alkyl radicals with a compound selected from the group consisting of alkali metal molybdates and ammonium molybdate in aqueous solution at a pH below 6 and recovering the precipitated product therefrom.

References Cited in the file of this patent

UNITED STATES PATENTS

| | | |
|---|---|---|
| 2,544,904 | Steiger | Mar. 13, 1951 |
| 2,742,476 | Bernstein et al. | Apr. 17, 1956 |
| 2,809,971 | Bernstein et al. | Oct. 15, 1957 |
| 2,863,802 | Pyne | Dec. 9, 1958 |
| 2,909,459 | Hovey | Oct. 20, 1959 |

FOREIGN PATENTS

| | | |
|---|---|---|
| 761,171 | Great Britain | Nov. 14, 1956 |